United States Patent [19]

Renaudin

[11] 4,075,432
[45] Feb. 21, 1978

[54] TELEPHONE CONCENTRATOR

[75] Inventor: Yves Renaudin, Bougival, France

[73] Assignee: Societe Lannionnaise d'Electronique Sle-Citerel S.A., Lannion, France

[21] Appl. No.: 741,080

[22] Filed: Nov. 11, 1976

[30] Foreign Application Priority Data

Nov. 21, 1975 France .................................. 75 35686

[51] Int. Cl.² ........................... H04J 3/00; H04Q 3/60
[52] U.S. Cl. ........................... 179/18 FC; 179/15 AT
[58] Field of Search ........... 179/18 FC, 15 AQ, 18 H, 179/18 J, 15 AT

[56] References Cited

U.S. PATENT DOCUMENTS 3,676,855  7/1972  Tallegas ............................. 179/18 J
3,825,690  7/1974  Kelly et al. ........................ 179/18 J Primary Examiner—Thomas A. Robinson
Attorney, Agent, or Firm—Sughrue, Rothwell, Mion, Zinn and Macpeak

[57] ABSTRACT

A concentrator for use in a PCM telephone network. The concentrator has conventional units such as line equipments, a space concentration network and a coder/decoder-PCM sampler and additionally includes a time cross-connection network and two different types of junctors, one type being a complete junctor and the other type (a simplified type) conducting only during the conversation part of a call. The concentrator therefore arranges firstly for a normal junctor to set a call up, then subsequently releases it, substituting it by a simplified junctor. This substitution causes a complementary modification of the time connection in the time connection network to keep the same connection channel with the exchange.

6 Claims, 5 Drawing Figures

TELEPHONE CONCENTRATOR

The present invention is applicable to telephone switching and relates to a concentrator which connects subscriber lines to an exchange and which has successively connected subscriber line equipment, at least one space switched concentration network, junctors and coder/decoders for analog/digital and digital/analog conversion, the coder/decoders being connected to multiplexers in which the data is of the pulse code modulation type (PCM).

A concentrator is a device which is connected to subscriber sets (usually over individual subscriber line pairs) and in which the number of outgoing channels towards a telephone exchange is less than the number of subscribers served by the concentrator.

The invention relates in particular to a concentrator which, in addition to concentration, also converts analog signals into PCM and which multiplexes a plurality of channels thus digitized. In the return direction towards the subscribers who are connected to the concentrator in question, the concentrator firstly demultiplexes the digital signals and then reestablishes analog signals by use of decoders.

Preferred embodiments of the invention reduce the number of components needed for such a concentrator without modifying its external functions (which is necessary to ensure the compatibility and the coexistence of the concentrator with conventional concentrators). Preferred embodiments are also adaptable relatively to the concentration rate which varies as a function of the subscriber traffic from one concentrator to the next.

The present invention provides a line concentrator for use in a telecommunications system to connect analog subscriber lines to a PCM exchange and comprising a successive connection of a plurality of subscriber line equipments, at least one space-switched concentration network, junctors, and coder/decoders for analog/digital and digital/analog conversion; wherein the junctors are of at least two different types including a "simplified" type capable of transmitting conversation but incapable of setting up a call and a "complete" type which is also capable of setting up a call, and wherein the coder/decoders are followed in the successive connection by a time-switched connection network including TDM-PCM ports for connection to a telephone exchange, the connector including control means for selecting a complete junctor during the setting up of a call through the concentrator and for switching the call through a simplified junctor once the call is established, the switching procedure being so arranged that the time connection network ensures that the exchange time channel is used throughout a call both before and after switching of the junctor.

In a preferred embodiment the time-switched network is a concentration network.

Taking into consideration the large number of channels which a time connection network can serve, it is useful to associate a single time connection network to at least two space concentration networks.

An embodiment of the invention is described hereinbelow by way of example with reference to the accompanying drawings in which:

FIG. 1 is a block diagram of a concentrator according to the invention;

FIGS. 2a and 2b symbolize two switching states of the concentrator during a single telephone call;

Figure 1:
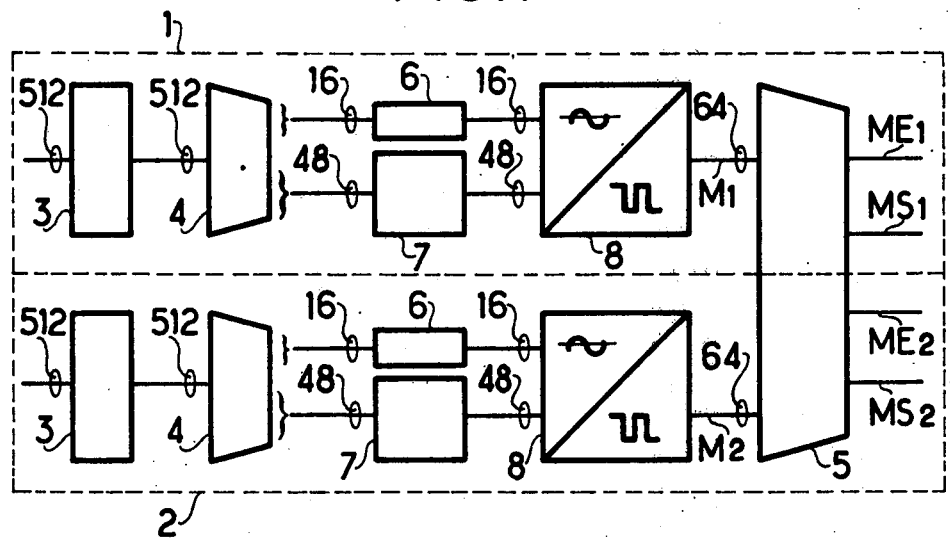

The principle of the invention will be described with reference to FIG. 1, which is the block diagram of a concentrator embodying the invention. This concentrator is composed of two concentration modules 1 and 2, each serving 512 subscribers. Each subscriber is connected to his own line equipment in the concentrator to which he is connected and which is constituted by a call relay and a call cut-out relay for example. The line equipments for the 512 subscribers of a module are symbolically shown in FIG. 1 by an assembly 3.

The line equipments are followed by a space concentration network which can serve 512 subscribers on one side and 64 lines on the concentrated side. Each module has such a network 4. It is formed of relay matrices arranged in several stages for example. The concentration rate must take into account the average calling rate of the subscribers. The space concentration network is optimized when both the number of subscribers and the number of concentrated lines are powers of two.

In a conventional concentrator, the space switching network is followed directly by an analog/digital converter which groups together e.g. thirty subscribers' lines in a multiplex frame, which is sent to the exchange; in the reverse direction, the digital signals are demultiplexed, then converted into VF analog signals and distributed by the concentrator to the appropriate subscribers' lines.

The detection of the calls, the search for erroneous calls, the search for itineraries etc. are effected by a logic control unit forming part of the concentration module, this logic unit being a micro-programmed minicomputer, not shown here.

Figure 4:
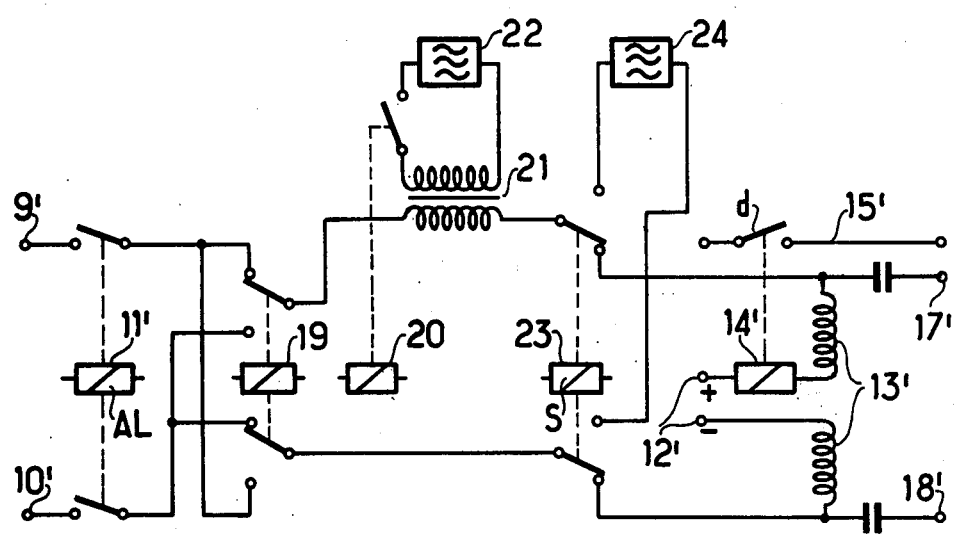
FIG. 4 is the circuit diagram of a standard or conventional junctor.

The junctors in a conventional concentrator are formed as shown in FIG. 4 for example. They have a plurality of relays for feeding the subscribers' sets with microphone current, for reversing the polarity of this current if need be, for injecting various tones including pay tone if need be, and for supplying ringing current. This conventional junctor will be described in greater detail below.

Figure 3:
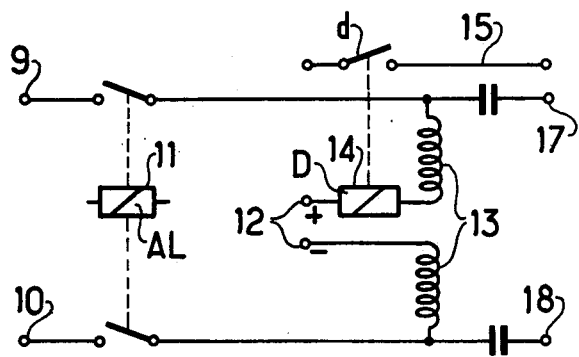
FIG. 3 is a circuit diagram of a simplified junctor.

As will be seen in FIG. 1, such an assembly 6 of junctors is provided for only a quarter of all the junctions, the assembly 7 of junctors has junctors of the simplified type as shown in FIG. 3, each simplified junctor being capable only of feeding the subscriber with microphone current. Therefore, a change of junctors is provided for during a call, so that the call is set up by means of a standard junctor, whereas the actual conversation passes only through the simplified junctor.

But as each of the outputs of the junctors corresponds rigidly to a particular channel of one of the output frames, this change of junctors would automatically cause the transfer of the call to another multiplex channel. This is not permissible in conventional concentrators and the concentrators according to the invention must be compatible and interchangeable therewith. Therefore a means which compensates this change inside the concentrator must be provided in the concentrator according to the invention.

It is well known in the art of telephone exchange that the exchange stages must be controlled such that a path is found through the different exchange stages between two subscribers who want to communicate. Blocking problems may occur which necessitate a rearrangement of exchange connections and, due to the complexity of these blocking problems, the control logic for controlling the exchange stage connections has become centralized as quickly as fast computers have become available. Thus, according to modern techniques, a computer or similar device determines the desired connections for each exchange stage and the corresponding instructions are stored in control memories associated with that particular stage. In the case of time division multiplex exchange networks, see, for example, U.S. Pat. 3,676,855 (F. TALLEGAS), which describes the use of individual control memories allocated to each junction line for preventing blocking problems in a time-switched data communication system. If a change of an existing communication path is desired in such a network, for example in order to establish a new communication, a computer furnishes the proper instructions to the control memories of the different stages.

In the telephone concentrator according to the present invention the same procedure can be followed in order to maintain the same exchange time channel throughout a call both before and after switching of the junctors. Thus, the connection network shown in FIG. 2 of the above-referenced patent could be used as the time-switched connection network 5 shown in FIG. 1 of the present application, and it would only be a matter of software to assure that the exchange networks 4 and 5 of the present invention are controlled simultaneously in such a way that the time multiplex output channel of network 5 remains unchanged throughout the call period.

In a particularly advantageous example of the invention, the time network 5 shares the concentration function with the space network 4.

A concentrator according to the invention therefore successively comprises the line equipment assembly 3, a space concentration network 4, whose concentration rate is eight, for example, junctor assemblies 6 and 7, the majority of which are of the simplified type, and a sampling device for analog/digital conversion and multiplexing 8 (which, in the subscriber's direction, has a demultiplexer and digital/analog converters) followed lastly by the time connection network 5 which sends towards and receives from the exchange signals in the form of digital frames. In the practical example which is shown in FIG. 1, the time network effects not only the transfer of channels in the case of a change of junctors, but also a small amount of concentration at a rate of 64/60. This enables the optimizing of the space network 4, even if the number of channels available in the frame is not a power of two. This is indeed often the case, for one or two channels are kept for general signalling. The figures which are written on the various connection lines in FIG. 1 therefore show the capacity of this connection. Each of the connections M1 to M2 between the converter device 8 and the time connection network 5 has two multiplexes with thirty-two channels per frame in the transmission direction and two multiplexes with thirty-two channels per frame in the reception direction; each of the connections ME1, ME2 and MS1, MS2 between the time connection network 5 and the exchange has two multiplexes with thirty-two channels per frame, the connections ME1 and ME2 being used for transmission and the connections MS1 and MS2 being used for reception. Of course, the time connection network 5 makes it possible in the transmission direction to connect a time channel of a multiplex of the connections M1, M2 to a time channel of a multiplex of the connections ME1, ME2 and in the reception direction to connect a time channel of a multiplex of the connections MS1, MS2 to a time channel of a multiplex of the connections M1, M2. In the concentration module 1, the sixteen junctors of the assembly 6 and the first sixteen simplified junctors of the assembly 7 are connected through the conversion device 8 to a transmission multiplex and a receiving multiplex of the connection M1; the same applies in the concentration module 2 with the connection M2. When the junctor changes, it is therefore possible to avoid changing the multiplex for transmission and reception, but there is then a change of time channel; the time connection network changes the time channel at the transmission so that the call will always be routed by the same time channel in the same connection with the exchange; during reception, the call coming from the exchange must be routed towards the same receiving multiplex of the connection M1 and the time connection network changes the time channel as necessary for serving the simplified junctor selected at the change of junctors. If the change of junctors causes a change of multiplex in the connection M1 for transmission and for reception, there is generally also a change of time channel; in the transmission direction the time connection network 5 will then provide the required change of multiplex and of time channel to ensure that the call continues to use the same multiplex with the same time channel on its way to the exchange; in the receiving direction, the time connection network 5 receives the call from the exchange and ensures the required change of multiplex and of time channel necessary to serve the simplified junctor selected at the change of junctors.

Figure 2A:
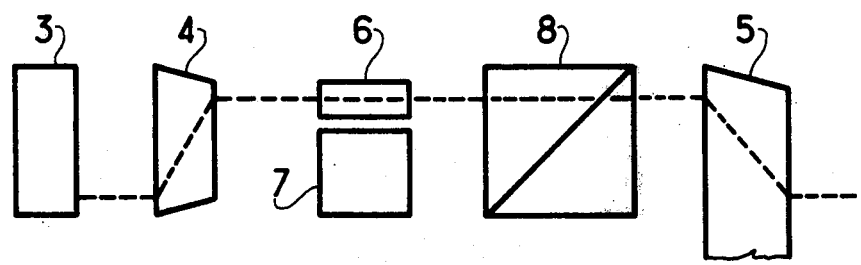
Figure 2B:
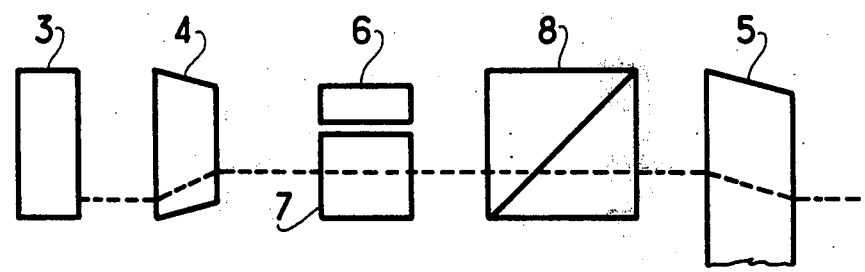

When one of the 512 subscribers linked to a concentration module lifts his hand-set, a standard junctor of the assembly 6 is immediately ascribed to him and an available connection towards the exchange is set up through this junctor. This situation is schematically shown in FIG. 2a, in which the same reference numerals are used for elements which are identical to those in FIG. 1. The transfer of dial tone to the subscriber and the transmission of the dialing pulses towards the exchange take place as in a conventional concentrator. But as soon as the called party answers, the control logic of the concentrator according to the invention searches for a free junctor in the assembly 7 to make the conversation transit through this junctor and free the standard junctor. This situation is schematically shown in FIG. 2b. As has been said hereinabove, this change of junctors causes a change of channels in the multiplex frame at the coder of the device 8 (see FIG. 1); to cancel this change, the control logic of the concentrator so modifies the state of the connections in the time connection network 5 in a complementary manner that the same multiplex channel in the connection with the exchange remains engaged despite the change of junctors.

It should nonetheless be observed that this change of junctors is not essential, since a standard junctor is in principle in a position also to transmit the conversation signals (as has been the case up to now). It is indeed possible for a change of junctors to be undesirable or impossible and in such a case, no change of junctors takes place. A change is not desirable in the case of a coin-box subscriber or of an uncharged caller (emergency call) and a change is not possible when all the simplified junctors are already engaged or when the change would cause blocking of the time or space network.

An incoming call is processed in a similar way. When a call reaches the concentrator, it engages a time channel of a multiplex forming a part of the time network 5 and the control logic of the concentrator ascribes to it firstly a standard junctor (FIG. 2a) to transmit ringing current to the called subscriber and to feed microphone current to the line. When the hand-set is lifted, the control logic of the concentrator searches for a free simplified junctor (FIG. 2b) while keeping the same time channel on the incoming multiplex in the time network 5 engaged. The present concentrator is therefore absolutely compatible with conventional concentrators which keep to one standard junctor in the connection throughout a whole call.

To complete the description, the structure of the junctors remains to be described in greater detail.

FIG. 3 shows a simplified junctor of which there are forty-eight in the assembly 7 in FIG. 1. The unique function of this junctor is to feed the subscriber with microphone current having a "reverse" polarity. The subscriber has a metallic connection to this junctor through terminals 9 and 10, which are connected to the space network 4. In the conversation loop, there are two contacts of a feeder relay 11 for setting up the link. When this relay is energized, a battery is applied across two terminals 12 and feeds current to the subscriber through two inductances 13, which act as a low-pass filter. In the feed branch circuit, there is a relay 14 which monitors the state of engagement of the subscriber loop and which uses an extra wire 15 to indicate to the concentrator when the subscriber rings off. Two terminals 17 and 18 of the junctor are connected to the converter device 8 of FIG. 1.

If, as is often the case, the line current should be reversed when the called subscriber answers, the structure according to the invention makes this reversing very simple. Indeed, it is sufficient to reverse the wires at the input of the conversation junctor and the polarity is automatically reversed when the junctor changes. The simplified junctor therefore does not need a polarity reversing relay as does a standard junctor.

This standard junctor is shown in FIG. 4. Like the simplified junctor, it is connected to the space network 4 by terminals 9' and 10' and to the converter device 8 by terminals 17' and 18' and like the simplified junctor, it is connected by two terminals 12' to a battery and it comprises in the feed branch circuit two inductances 13' to avoid the short circuiting of the conversation signals through the battery. The loop monitoring relay 14', the extra wire 15' and the feeder relay 11' are also shown therein.

Besides these elements which are already shown in the simplified junctor and which enable conversation to take place, the standard junctor has a relay 19 for reversing the line feed, a relay 20 injecting the pay tone signals coming from a common pay tone signal generator 22 through a transformer 21 and a ringing relay 23 which feeds ringing current to the subscriber loop from a ringing current generator 24 common to all the standard junctors. Other signals may be provided at the junctor where appropriate for particular telephone systems, e.g. meter pulse repeating tones, engaged tone, trunk call timing "pips" etc.

As such a junctor is currently employed in conventional concentrators, it is needless to explain here in detail its operation which is controlled by the control logic, not shown.

In order to underline the importance of the invention, the advantages obtained thereby must lastly be summarized. In the first instance, the versatility of adaptation of the structure with respect to the concentration rate, i.e., the ratio between the number of subscribers and the number of channels of the multiplex. This versatility of adaptation is due to the insertion of the time network, which as is known, can be modified more smoothly than a space network in which the concentration rate practically cannot be changed except by powers of two. This causes a reduction in the number of multiplex lines necessary.

Extra reduction of equipment is obtained by the possibility of obtaining in the time network a concentration rate differing by a whole number; as will be seen in FIG. 1, there are sixty-four junctors which serve an average of two multiplex lines with thirty channels each. Due to this concentration in the time network 5, the output capacity of the space network can be fully used.

Another obvious advantage of the structure according to the invention resides in the reduction of equipment by the replacing of the majority of standard junctors by simplified junctors.

What we claim is:

1. In a line concentrator for use in a telecommunications system to connect analog subscriber lines to a PCM exchange and including a successive connection of a plurality of subscriber line equipments, at least one spaceswitched concentration network, junctors, and coder/decoders for analog/digital and digital/analog conversion, the improvements characterized by: said junctors comprising at least two different types including a "simplified" type capable of transmitting conversation but incapable of setting up a call and a "complete" type which is also capable of setting up a call, the concentrator including control means for selecting a complete junctor during the setting up of a call through the concentrator and for switching said call through a simplified junctor once the call is established, the coder/decoders being followed in the successive connection by a time-switched connection network for changing the multiplex time channel of said call in response to the change of junctors so that the same multiplex time channel is used throughout a call both before and after switching of the junctor.

2. A concentrator according to claim 1, wherein the time-switched connection network is a concentration network.

3. A concentrator according to claim 1, wherein the time-switched connection network serves at least two space-switched concentration networks.

4. A concentrator according to claim 1, wherein the simplified junctors are arranged to feed the subscriber line equipments with "reversed" polarity line current whereas the complete junctors enabling a call to be put through have means for feeding the subscribers' sets with a current, for reversing the polarity of the current and for injecting the ringing current and the trunk call charge signals.

5. A concentrator according to claim 2, wherein the complete junctors include line current feed means, line feed reversing means, ringing current supply means and tone feeding means.

6. A concentrator according to claim 5, wherein the tone feeding means comprises a supply of pay tone.

* * * * *